US008589077B2

(12) United States Patent
Obert

(10) Patent No.: US 8,589,077 B2
(45) Date of Patent: Nov. 19, 2013

(54) METHODS FOR TRANSMISSION AND/OR PROCESSING OF TRAFFIC INFORMATION

(75) Inventor: Georg Obert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/348,186

(22) Filed: Jan. 11, 2012

(65) Prior Publication Data

US 2012/0109524 A1 May 3, 2012

Related U.S. Application Data

(63) Continuation of application No. PCT/EP2010/004243, filed on Jul. 13, 2010.

(30) Foreign Application Priority Data

Aug. 11, 2009 (DE) ......................... 10 2009 037 087

(51) Int. Cl.
*G08G 1/0968* (2006.01)
*G08G 1/09* (2006.01)
*G01C 21/26* (2006.01)

(52) U.S. Cl.
USPC ............ 701/533; 701/117; 701/201; 701/537

(58) Field of Classification Search
USPC ..................... 701/533; 70/537, 533, 117, 201
See application file for complete search history.

(56) References Cited

U.S. PATENT DOCUMENTS

| | | | | |
|---|---|---|---|---|
| 588,947 A * | 8/1897 | Bliss | ............................... | 215/55 |
| 5,889,477 A | 3/1999 | Fastenrath | | |
| 6,374,175 B1 * | 4/2002 | Verron et al. | ................. | 701/537 |
| 2006/0074546 A1 * | 4/2006 | DeKock et al. | ............... | 701/117 |
| 2006/0267794 A1 * | 11/2006 | Lee et al. | ....................... | 340/905 |
| 2006/0268707 A1 | 11/2006 | Lee et al. | | |
| 2009/0105940 A1 * | 4/2009 | Bitan | ............................ | 701/201 |

FOREIGN PATENT DOCUMENTS

| | | | |
|---|---|---|---|
| DE | EP 0715288 A1 * | 6/1995 | |
| DE | 101 10 549 A1 | 9/2002 | |
| DE | 698 33 679 T2 | 8/2006 | |
| DE | 10 2006 021 015 A1 | 11/2007 | |
| DE | 102006021015 A1 * | 11/2007 | |
| DE | 10 2007 026 493 A1 | 12/2008 | |
| DE | 10 2007 050 154 A1 | 4/2009 | |
| EP | 0 715 288 A1 | 6/1996 | |
| EP | 0 798 684 B1 | 1/2001 | |
| EP | 1 580 531 A2 | 9/2005 | |
| EP | 1 528 524 B1 | 9/2008 | |

OTHER PUBLICATIONS

Human translation of patent DE102006021015A1.*
Human translation of patent EP0715288A1.*
International Search Report dated Nov. 8, 2010 with English translation (six (6) pages).
German Search Report dated May 6, 2010 with partial English translation (nine (9) pages).

* cited by examiner

*Primary Examiner* — Helal A Algahaim
*Assistant Examiner* — Yazan A Soofi
(74) *Attorney, Agent, or Firm* — Crowell & Moring LLP

(57) ABSTRACT

A method of transmitting traffic information is provided, wherein the traffic information is forecast, a pattern for the traffic information is determined, and an indicator for identifying the pattern is transmitted. In a method for processing traffic information, an indicator for identifying a pattern is received, forecast traffic information is determined by use of the indicator, and a navigation is carried out by taking the forecast traffic information into account.

18 Claims, 2 Drawing Sheets

METHODS FOR TRANSMISSION AND/OR PROCESSING OF TRAFFIC INFORMATION

CROSS-REFERENCE TO RELATED APPLICATIONS

This application is a continuation of PCT International Application No. PCT/EP2010/004243, filed Jul. 13, 2010, which claims priority under 35 U.S.C. §119 from German Patent Application No. DE 10 2009 037 087.0, filed Aug. 11, 2009, the entire disclosures of which are herein expressly incorporated by reference.

BACKGROUND AND SUMMARY OF THE INVENTION

The invention relates to a method of transmitting traffic information and to a method of processing traffic information, as well as to a corresponding device.

It is known to transmit traffic reports into vehicles in a coded manner and to use a navigation system for the route computation.

Particularly for longer routes, it is advantageous to also transmit traffic forecasts. For avoiding an alternate route computation from taking place prematurely, which would not have been necessary at all because the current traffic interruption could have been eliminated by the time it is reached, it is advantageous to also transmit traffic forecasts, by which it is possible to forecast the interruption and thereby judge its relevance to the respective travel route. If, according to the forecast, the traffic interruption will still be present when the vehicle reaches the site of the traffic interruption, an alternate route can already be taken into account at that time. If, in contrast, the forecast of the traffic interruption indicates the possibility that the latter may be eliminated as soon as when the vehicle reaches the site of the traffic interruption, this specific traffic interruption may be ignored when the route is calculated.

Known protocols for the transmission of traffic reports are TMC Alert-C and TPEG (Transport Protocol Experts Group) with the application-specific definitions CTT (Congestion and Travel Time) and TFP (Traffic Flow and Forecast). These protocols permit the transmission of traffic forecasts.

It is a disadvantage of the existing approaches that, for forecasts based on individual road segments or route sections, separate speeds are assigned to each time slot. This results in a considerable amount of data which must be transmitted to the vehicles for each road segment. The transmission of such quantities of data requires correspondingly high expenditures and therefore significant costs.

It is an object of the invention to avoid the above-mentioned disadvantages and particularly to provide an efficient solution for transmitting data for a road-segment-based forecast.

This and other objects are achieved according to the invention by providing a method of transmitting traffic, wherein: the traffic information is forecast; a pattern for the traffic information is determined; and an indicator for identifying the pattern is transmitted.

Here, it is an advantage that the indicator clearly references the pattern and therefore only the indicator can be transmitted instead of the pattern. In particular, a predefined number of contemplated patterns are indicated, so that an unambiguous indicator can be assigned to each pattern. In principle, the number of patterns can define the quantity of data required for the transmission of the indicator. If there are, for example, 1,024 patterns, an indicator of a 10-bit length will be sufficient for unambiguously identifying the respective pattern.

As a result of the clear reduction of the data quantity necessary for the transmission of the pattern, conventional protocols, such as the TPEG, can be efficiently used in order to transmit forecast traffic information to navigation systems.

Correspondingly, the patterns can be equally stored at the sender and at the receiver, so that the transmission of the indicator will be sufficient for unambiguously identifying on both sides the pattern "addressed" by the indicator.

In a further aspect of the invention, a report concerning a current traffic condition is transmitted with the indicator. Preferably a report is transmitted together with the indicator, which report describes, for example, the traffic condition (traffic jam, congested traffic, etc.).

In a still further aspect of the invention, the indicator is transmitted to at least one motor vehicle. In particular, the indicator can be transmitted to a plurality of receivers by way of a broadcast message. Particularly, a point-to-multipoint connection can be used for the transmission.

In yet another further aspect, the indicator is transmitted to a receiver upon a prompt by the receiver.

It is therefore also contemplated that a point-to-point connection is used, for example, established, in order to transmit the indicator, possibly together with additional (traffic) information.

It is also a further development that the indicator is transmitted based on an application-specific transmission protocol, particularly a TPEG protocol. In addition, it is a further development that the indicator is transmitted by use of a mobile radio interface, especially by use of a mobile telecommunications network.

Within the scope of an additional further development, the traffic information is forecast for at least one road segment, in which case particularly a plurality of indicators is transmitted for a plurality of road segments.

A further aspect of the invention consists of the fact that the traffic information is forecast by way of a current event and/or by way of past values, particularly for the respective road segment.

It is a further development that the pattern is determined by use of the indicator by a navigation unit, and a route computation takes place while taking the pattern into account.

In an alternative embodiment, the traffic information is forecast, wherein conceivable speed ranges are determined for a forecast time period.

The forecast time period preferably is a future time period (for example, the current time plus two hours) for which a traffic forecast is made (for example, per road segment). This time period can be scaled in a flexible manner. For each time unit of the forecast time period, the speed range can be determined which can most probably be reached by a vehicle because of the traffic situation in the road segment. This information is transmitted in the form of the pattern for the road section in a coded manner by way of the indicator to the navigation system, which can draw a conclusion with respect to the pattern by use of the indicator and, relative to the own route planning, can use the received information, i.e. the traffic forecasts.

It is a further aspect of the invention that the pattern for the traffic information is determined in that the forecast traffic information is compared with a quantity of patterns and the pattern that best describes the forecast traffic information is selected.

A method can be used here that determines the best fit by way of given criteria and uses the pattern determined as fitting for describing the forecast traffic information and transmits the indicator linked to this pattern.

A method of processing traffic information is also provided, wherein an indicator for identifying a pattern is received; forecast traffic information is determined by use of the indicator; and a planning of the route is carried out by taking the forecast traffic information into account.

The above-indicated statements correspondingly apply to this method.

The above-mentioned objects are also achieved by a device for data processing comprising a processor unit and/or an at least partially hardwired circuit arrangement, which is set up such that the method can be implemented as described here.

It is a further development that the device is a navigation system, particularly a navigation system in a motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

In order to permit an efficient traffic forecast and transmission of suitable patterns to the vehicles, a time-related forecast (a so-called forecast horizon) as well as the driven speed for a given road segment is divided into a given number of time domains and speed ranges.

The traffic forecast can be transmitted per road segment in the form of this pattern (for example, as a gear curve) comprising the time-related forecast of the possible speeds.

Traffic interruptions arise and disappear according to a similar pattern. Correspondingly, a two-dimensional structure including a travel time and a traffic density per road segment can be established, for example, as a table, and can be used for describing a course of a traffic interruption. Each table advantageously receives an (unambiguous) indicator.

Thus, per road segment of a traffic report, the identifier can be attached (for example, as indicator information to the respective table assigned to the identifier). In the case of a byte-oriented protocol, such as TPEG, different tables or patterns can be identified by means of an indicator of 8 bits $2^8=256$.

In this case, it is advantageous that, in the case of a traffic information service provider who provides traffic forecasts, that table one can selected (from the number of 256 possible tables mentioned as an example) that describes with the highest probability the traffic condition relevant to the road section some time soon. The indicator for this table is attached to the traffic report concerning the traffic condition for the road segment and is transmitted to the vehicle.

In the vehicle, for example, a navigation system has an identical set of tables and/or patterns. In the vehicle, the received indicator therefore permits the unambiguous identification of the table linked with the indicator. The navigation system can now carry out a dynamic route guidance based on the tables for the road segments of the planned route. For example, the travel time is calculated, for example, in sections, also as a function of the traffic volume in the respective road segment (based, for example, on the speeds per time unit contemplated according to the table). On this basis, the travel time of the vehicle can be determined as a function of the present location and the point-in-time of the location of the vehicle as well as of the forecast time delays because of possible traffic interruptions. This travel time can correspondingly be compared with travel times of other routes (which are determined according to the same pattern). Thus, for example, the route can be determined which is most favorable with respect to time, while taking into account very different traffic forecasts.

Figure 1:
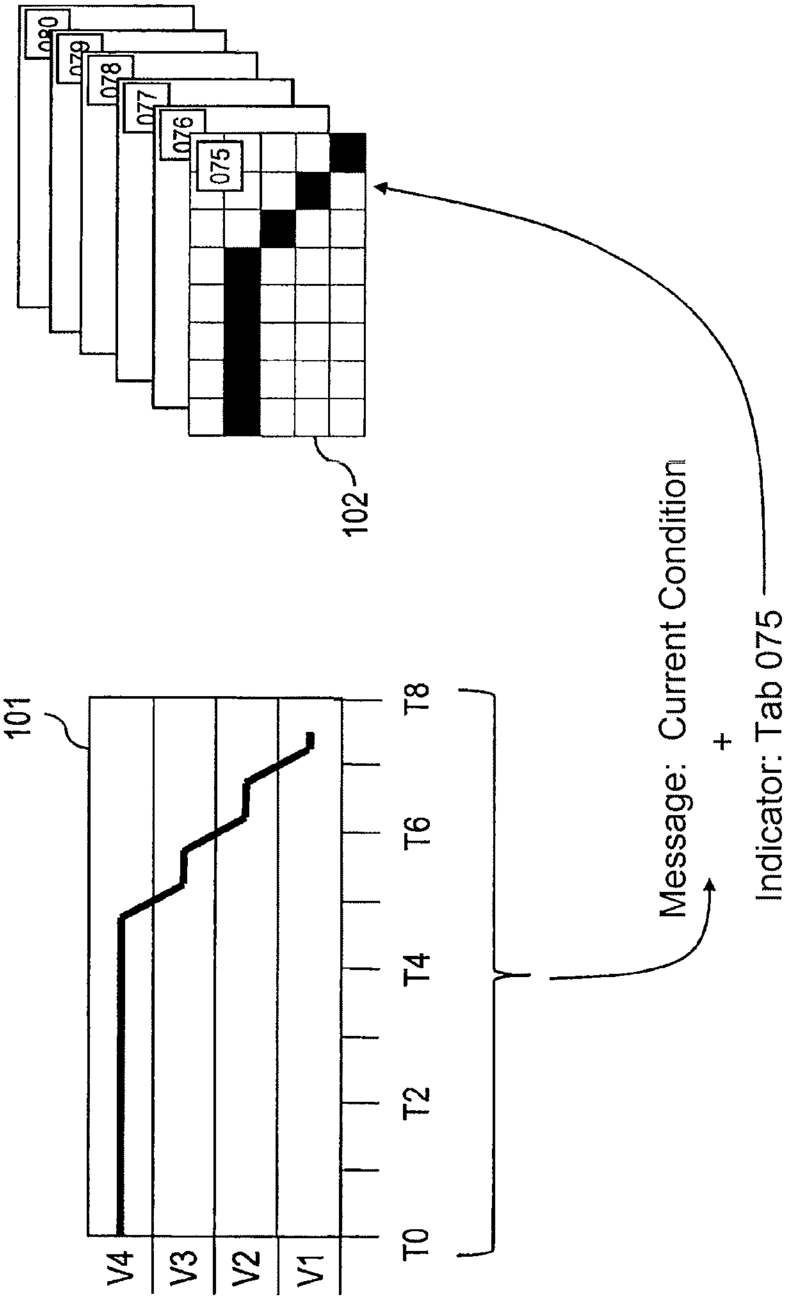
FIG. 1 is a two-dimensional representation of several speed ranges over several time domains for a given road segment, this representation being illustrated by a table.

FIG. 1 shows, for example, a two dimensional representation 101 of several speed ranges Vi (such as V1 to V4) over several time domains Ti (such as T0 to T8) for a given road segment. This representation corresponds to a forecast of a service provider for this road segment. In this case, a current event (for example, a traffic disruption) and/or historical knowledge concerning a traffic volume in the road segment can be taken into account (for example, rush-hour traffic Monday morning 7:00 to 9:00 a.m). The example according to representation 101 therefore shows for the road segment that a speed V4 is possible in the road segment from now on (point-in-time T0) to close to point-in-time T5. According to the forecast, with the increasing time duration, a reduced speed is now possible on the road segment. This corresponds to the forecast of a traffic disruption approximately starting at the point-in-time T5.

Here, it is noted that in the individual time sections, Ti can be scaled arbitrarily. For example, the forecast of the service provider can concern a time period of two hours and can be regularly updated, for example, every 15 minutes and/or as soon as the traffic situation changes.

In particular, a forecast can be made for each road segment, in which case the road network can preferably be divided into individual road segments per road.

Thus, representation 101 corresponds to a traffic forecast to a point-in-time T8, thus for a time period T0-T8. The precision or resolution of such a representation may be selected arbitrarily. In particular, an arbitrary subdivision of the time axis or of the speed ranges can take place. Preferably, a message for the concerned road segment is generated by the determined representation 101, which message has the current condition (for example, traffic jam, construction site or the like) and contains an indicator to a Table 102 "Tab 075", which is an image of representation 101. It is hereby noted that, for the currently determined representation 101, that table 102 is selected from a quantity of possible and previously defined tables that coincides best with representation 101.

Figure 2:
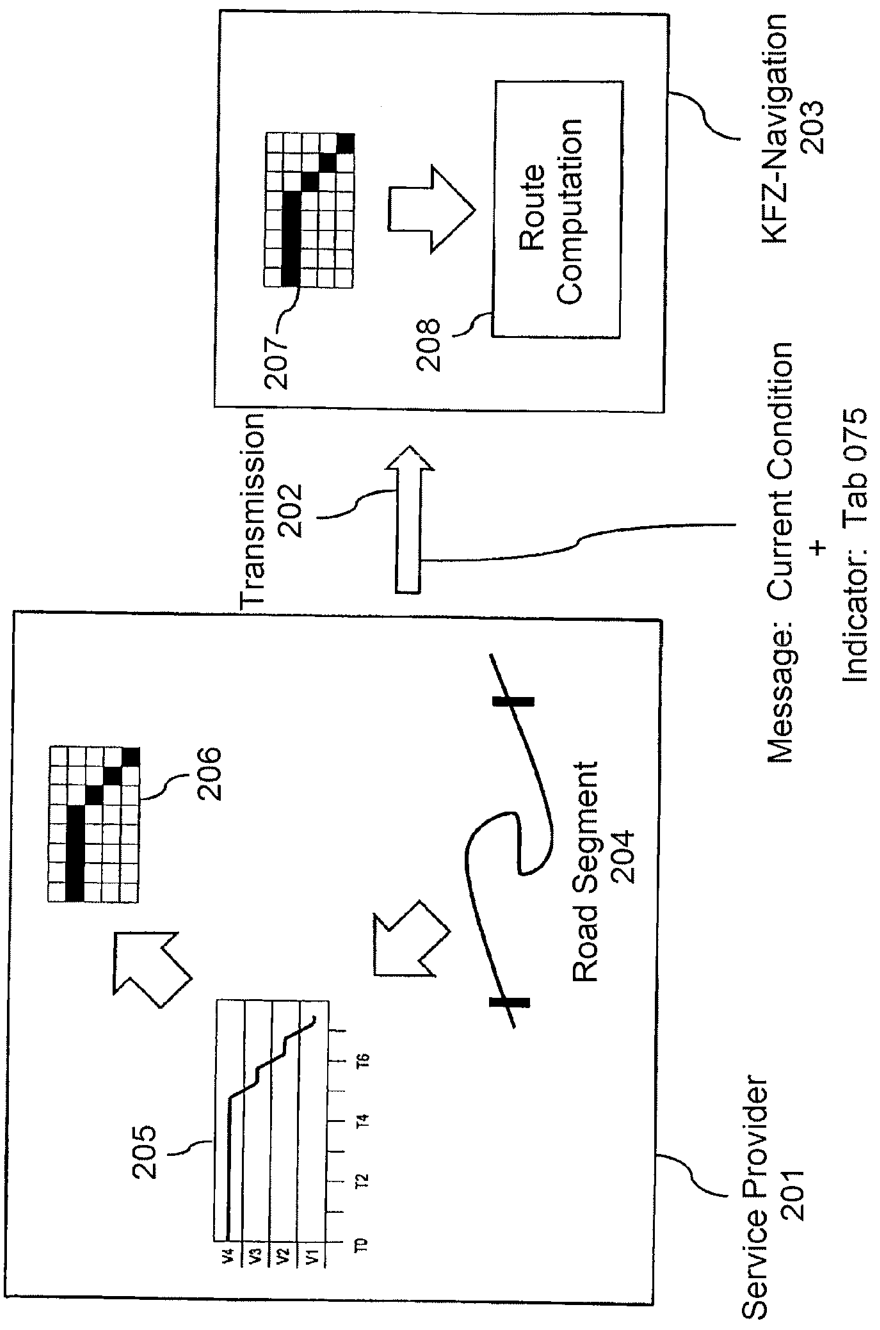
FIG. 2 is a symbolic representation concerning a transmission of a report from a service provider to a motor vehicle navigation.

FIG. 2 is a symbolic representation concerning a transmission 202 of a message from a service provider 201 to a motor vehicle navigation system 203.

A coding 206 of a representation 205 based on a traffic forecast for a road segment is referenced by the service provider by way of an indicator "Tab 075" and is transmitted with the message concerning the current condition for the road segment 204 to the motor vehicle navigation system 203. By use of the indicator "Tab 075", the motor vehicle navigation system 203 can call the, for example, locally stored table 207 and take the latter into account for computing the route for the road segment 204. Correspondingly, the motor vehicle navigation system 203 can take into account a plurality of tables for different road segments and can thereby determine, for example, a time duration to the arrival at an entered navigation destination by means of a route computation 208.

It is therefore advantageous that the information contained in the respective table 206 does not have to be transmitted individually but that only the indicator for identifying the table 206 or 207 is transmitted. As a result, the data volume to be transmitted can clearly be reduced. Correspondingly, the demands on the bandwidth or bit rate required for the transmission of the traffic forecast are clearly reduced.

The efficient transmission of traffic forecasts, when the TPEG protocol is used, results in a reduction of the data volume by a factor of at least 5. By means of the approach introduced here, traffic forecasts can also be efficiently transmitted by way of a mobile radio interface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of transmitting traffic information, the method comprising the acts of:

determining, by a traffic information service provider computer, traffic forecast information for a road segment, wherein the traffic forecast information comprises forecasts of possible vehicle speeds for the particular road segment over a plurality of future time periods;

comparing, by the traffic information service provider computer, the traffic forecast information with a number of stored patterns;

selecting, by the traffic information service provider computer, one of the stored patterns best describing the forecast traffic information;

identifying, by the traffic information service provider computer, a predefined indicator corresponding to the selected pattern; and transmitting, by the traffic information service provider computer to at least one motor vehicle, the predefined indicator corresponding to the selected pattern without additionally transmitting the traffic forecast information or the selected pattern.

2. The method according to claim 1, further comprising the act of transmitting a message along with the indicator, the message relating to a current traffic condition.

3. The method according to claim 1, wherein the transmitting act occurs via a message broadcast for a plurality of receivers.

4. The method according to claim 1, further comprising the act of receiving a prompt from a receiver, the prompt prompting the transmission of the indicator for identifying the pattern.

5. The method according to claim 3, further comprising the act of receiving a prompt from a receiver, the prompt prompting the transmission of the indicator for identifying the pattern.

6. The method according to claim 1, wherein the indicator is transmitted based on an application-specific transmission protocol.

7. The method according to claim 6, wherein the application- specific transmission protocol is a TPEG protocol.

8. The method according to claim 1, wherein the indicator is transmitted via a mobile radio interface.

9. The method according to claim 1, wherein a plurality of indicators are further transmitted for each of a plurality of road segments.

10. The method according to claim 9, wherein the traffic forecast information is forecast based upon at least one of a current event and past values at least for a respective road segment.

11. The method according to claim 1, wherein the indicator for identifying the pattern is such that a navigation unit is capable of determining the pattern using the indicator and computing a route factoring the pattern into account.

12. The method according to claim 1, wherein the forecast of the traffic forecast information determines possible speed ranges for a defined forecast time period.

13. The method according to claim 1, further comprising assigning each of the number of stored patterns to a corresponding number of indicators, and wherein identifying the predefined indicator further comprises selecting a particular one of the number of indicators that corresponds to the selected pattern.

14. A method of processing traffic information, the method comprising the acts of:

receiving, by a navigation system of a motor vehicle, an indicator corresponding to a pattern indicative of a forecast traffic information for a road segment, wherein the traffic forecast information comprises forecasts of possible vehicle speeds for the particular road segment over a plurality of future time periods;

determining, by the navigation system, the forecast traffic information by identifying one of a plurality of stored patterns using only the indicator, wherein each of the plurality of stored patterns corresponds to a particular traffic condition ; and computing, by the navigation system, a planned route, which includes the road segment, factoring into account the forecast traffic information determined via the indicator.

15. The method according to claim 14, wherein the act of determining the forecast traffic information and computing the planned route is carried out via a navigation unit in the motor vehicle.

16. An apparatus for route planning with respect to a vehicle, the apparatus comprising:

a navigation system for use with the vehicle, the navigation system comprising a processor that:

receives an indicator corresponding to a pattern determined for a forecast traffic information for a road segment, wherein the traffic forecast information comprises forecasts of possible vehicle speeds for the particular road segment over a plurality of future time periods;

determines the forecast traffic information by identifying one of a plurality of stored patterns using only the indicator, wherein each of the plurality of stored patterns corresponds to a particular traffic condition; and computes a route, which includes the road segment, for the vehicle as a function of the determined forecast traffic information.

17. The apparatus according to claim 16, wherein the navigation system outputs a prompt for receipt of the indicator.

18. The apparatus according to claim 16, wherein the navigation system receives the indicator via a mobile radio interface.

* * * * *